(12) United States Patent
Sacripante

(10) Patent No.: US 6,663,802 B2
(45) Date of Patent: Dec. 16, 2003

(54) PROCESSES FOR MAKING BICHROMAL PARTICLES FOR GYRICON DISPLAYS

(75) Inventor: Guerino G. Sacripante, Oakville (CA)

(73) Assignee: Xerox Corporation, Stamford, CT (US)

(*) Notice: Subject to any disclaimer, the term of this patent is extended or adjusted under 35 U.S.C. 154(b) by 358 days.

(21) Appl. No.: 09/682,162

(22) Filed: Jul. 30, 2001

(65) Prior Publication Data
US 2003/0020187 A1 Jan. 30, 2003

(51) Int. Cl.⁷ ............................. B29D 11/00; B29B 9/08
(52) U.S. Cl. ............................. 264/1.7; 264/6; 264/343
(58) Field of Search ........................ 264/1.1, 1.7, 437, 264/438, 439, 343, 4.1, 5, 8, 6; 425/445, 446, 6, 8

(56) References Cited

U.S. PATENT DOCUMENTS

| 4,261,653 A | 4/1981 | Goodrich |
| 5,262,098 A | 11/1993 | Crowley et al. |
| 5,344,594 A | 9/1994 | Sheridon |
| 5,370,964 A | 12/1994 | Patel et al. |
| 5,389,945 A | 2/1995 | Sheridon |
| 5,717,514 A | 2/1998 | Sheridon |
| 5,989,629 A | 11/1999 | Sacripante et al. |
| 6,097,531 A | 8/2000 | Sheridon |
| 6,241,921 B1 * | 6/2001 | Jacobson et al. ............ 264/1.7 |

* cited by examiner

Primary Examiner—Mathieu D. Vargot
(74) Attorney, Agent, or Firm—Oliff & Berridge, PLC

(57) ABSTRACT

In-situ processes for making bichromal particles include forming particles having a one color and an anionic surface charge, and separately forming particles having another color and a cationic surface charge. The anionic and cationic particles are mixed, and aggregated to form bichromal aggregates. The aggregated particles are coalesced to form bichromal particles. The bichromal particles can be used in gyricon sheets and gyricon displays.

21 Claims, 1 Drawing Sheet

PROCESSES FOR MAKING BICHROMAL PARTICLES FOR GYRICON DISPLAYS

BACKGROUND OF INVENTION

1. Field of Invention

This invention is related to processes for making bichromal particles for gyricon displays.

2. Description of Related Art

Gyricon displays, also called twisting-ball displays, rotary ball displays, particle displays, dipolar particle light valves, etc., offer a technology for making a form of electric paper. Gyricon displays are addressable displays including a plurality of optically anisotropic balls, each of which can be selectively rotated to orient a desired surface for viewing by an observer. For example, gyricon displays can incorporate balls each having two distinct hemispheres, one black and the other white, with each hemisphere having a distinct electrical characteristic (e.g., zeta potential with respect to a dielectric fluid) so that the balls are electrically as well as optically anisotropic. Other kinds of rotating elements are also known. For example, U.S. Pat. No. 4,261,653, which is incorporated herein by reference in its entirety, discloses a multilayer sphere, although it is made at least in part from glass and its use depends on an addressing scheme involving high-frequency electric fields.

In known gyricon displays, the black-and-white balls are embedded in a sheet of optically transparent material, such as an elastomer layer, which contains spheroidal cavities and is permeated by a transparent dielectric fluid, such as a plasticizer. The fluid-filled cavities are sized to accommodate the balls, one ball per cavity, so as to prevent the balls from migrating within the sheet. The balls can be selectively rotated within their respective fluid-filled cavities, for example by application of an electric field, so as to present either the black or the white hemisphere to observers viewing the surface of the sheet. Thus, by application of an electric field that is addressable in two dimensions (as by a matrix addressing scheme), the black and white sides of the balls can be caused to appear as the image elements (e.g., pixels or subpixels) of a displayed image.

U.S. Pat. No. 5,389,945, incorporated herein by reference in its entirety, shows that gyricon displays can be made that have many of the desirable qualities of paper, such as flexibility and stable retention of a displayed image in the absence of power, not found in conventional display media. Gyricon displays can also be made that are not paper-like, for example, in the form of rigid display screens for flat-panel displays.

Gyricon displays are also disclosed in U.S. Pat. Nos. 5,262,098; 5,344,594; 5,717,514; 5,989,629 and 6,097,531, each incorporated herein by reference in its entirety.

SUMMARY OF THE INVENTION

This invention provides in-situ processes for making bichromal particles.

This invention also separately provides gyricon sheets and gyricon displays comprising the bichromal particles.

Exemplary embodiments of the in-situ processes for making bichromal particles according to this invention comprise forming first particles having a first color and an anionic surface charge, and separately forming second particles having a second color and a cationic surface charge. The first particles and second particles are mixed and aggregated to form bichromal aggregates. The aggregated first and second particles are coalesced to form bichromal particles that comprise one first particle and one second particle.

Exemplary embodiments of the processes for making gyricon sheets according to the invention comprise placing the bichromal particles in cavities of a transparent optical medium, which contain a transparent dielectric fluid, such that a single one of the bichromal particles is each cavity.

Exemplary embodiments of the processes for making gyricon displays according to the invention comprise placing a gyricon sheet between opposed substrates.

BRIEF DESCRIPTION OF THE DRAWINGS

Various embodiments of this invention will be described in detail, with reference to the following figure, wherein.

DETAILED DESCRIPTION OF THE PREFERRED EMBODIMENTS

Figure 1:
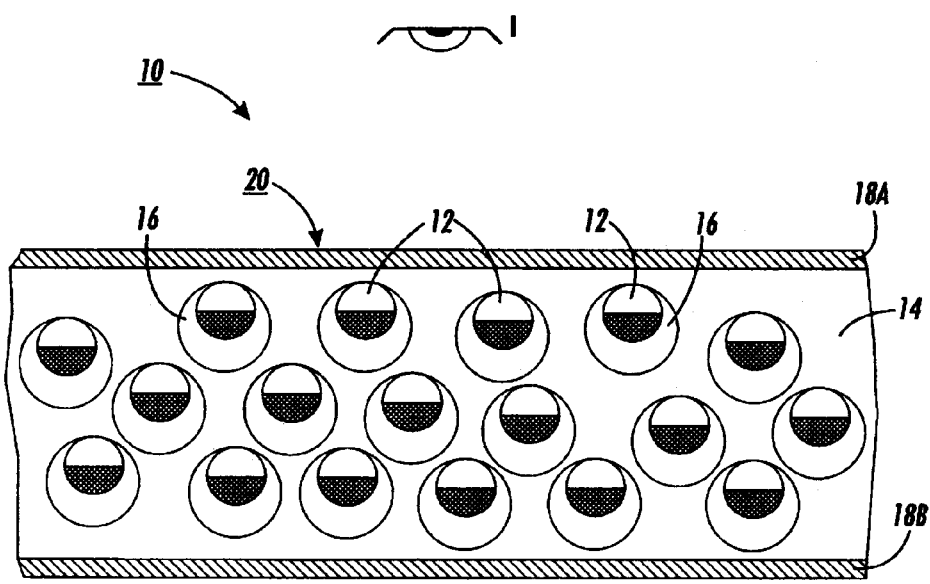
FIG. 1 shows an exemplary embodiment of a gyricon display according to the invention.

An exemplary embodiment of the processes of making bichromal particles according to the invention comprises forming particles having an anionic surface charge ("anionic particles"), and separately forming particles having a cationic surface charge ("cationic particles"), by an in-situ process. The anionic and cationic particles have different colors from each other.

The anionic and cationic particles can each have various different colors. For example, the anionic and cationic particles can be black or white. In other embodiments, the anionic and cationic particles can have other different colors, such as yellow, red, green, blue, or the like.

According to the invention, the anionic and cationic particles are separately formed by emulsion processes that use different emulsion latexes. The compositions of the emulsion latexes used to form the respective anionic and cationic particles are selected to provide the desired surface charge.

The anionic particles can be formed from acidic emulsion latexes. An exemplary acidic emulsion latex that can be used to form the anionic particles comprises a terpolymer of an anionic unsaturated monomer, and unsaturated monomer such as, for example, butyl acrylate and styrene. The anionic unsaturated monomer can be, for example, acrylic acid or methacrylic acid, or any other suitable anionic unsaturated monomer comprised of an olefinic moiety and carboxylic acid functionality. The unsaturated monomer can be, for example, styrene, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, pentyl acrylate, pentyl methacrylate, heptyl acrylate, heptyl methacrylate, octyl acrylate, octyl methacrylate, nonyl acrylate, nonyl methacrylate, decylacrylate, decylmethacrylate, lauryl acrylate, lauryl methacrylate, stearyl acrylate, stearyl methacrylate, or the like.

The anionic unsaturated monomer is added in an effective amount of from about 0.5 to about 5 wt % of the resin, and preferably from about 1 to about 3 wt % of the resin. The unsaturated monomer is selected in an effective amount of from about 0.5 to about 5 wt % of the resin, and preferably of from about 1 to about 3 wt % of the resin. The unsaturated monomer is selected in an effective amount of from about 95 to about 99.5 wt % of the resin, and preferably from about 95 to about 99 wt % of the resin.

An anionic initiator is typically added to the emulsion latex. The anionic initiator can be, for example, benzoyl peroxide, potassium persulfate, ammonium persulfate, or the like, and can be included in an amount of from about 0.5 to about 2 wt % of the resin.

A suitable pigment is added to the emulsion latex to provide the desired color of the anionic particles. For example, to form white anionic particles, titanium oxide can be used as the pigment. Other white pigments that can be utilized include zinc oxide, zirconium oxide and the like. The white pigment is included in an amount of from about 5 to about 40 wt % of the resin.

To form black anionic particles, any suitable pigments can be used. For example, suitable black colorants include, but are not limited to, carbon black, channel black, furnace black, acetylene black, lamp black, aniline black, mixtures thereof, and the like. Specific examples of these materials include, for example, Regal 330® carbon black (Cabot Corporation), Levanyl Black A-SF (Miles, Bayer) and Sunsperse Carbon Black LHD 9303 (Sun Chemicals). Suitable magnetites include, but are not limited to, iron oxides such as Mapico Black (Columbia), NP608 and NP604 (Northern Pigment), Bayferrox 8610 (Bayer), M08699 (Mobay), TMB-100 (Magnox), mixtures thereof and the like.

In embodiments, colorants other than black and white colorants can also be used. Thus, for example, any other colored dyes, pigments, or the like can be used to impart a desired color to the anionic or cationic particles. Colored pigments include red, green, blue, brown, magenta, cyan, and yellow particles, as well as mixtures thereof. Illustrative examples of magenta pigments include 2,9-dimethyl-substituted quinacridone and anthraquinone, identified in the Color Index as CI 60710, CI Dispersed Red 15, CI Solvent Red 19, Cadmium Red, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue Xo2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, Chrome Yellow, Zinc Yellow, Sicofast Yellow, Luna Yellow, Novaperm Yellow, and the like. Additional examples of pigments include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange Oreg. 2673 (Paul Uhlich), Chrome Orange, Bayplast Orange, Paliogen Yellow 152,1560 (BASF), Lithol Fast Yellow 0991 K (BASF), Paliotol Yellow 1840 (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF). Other suitable colorants include, for example, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast Blue, Heliogen Green, Cinquassi Green, Hostaperm Green, titanium dioxide, cobalt, nickel, iron powder, Sicopur 4068 FF. Other pigments can also be selected.

The aforementioned colorants are utilized in an amount of from about 3 to about 20 wt % of the resins.

As stated, the emulsion latex used to form the anionic particles is acidic. The acidic emulsion latex can have a pH range of from about 2 to about 5.

The anionic and cationic particles are preferably spherical, or substantially spherical shaped. Although less preferred, other similar shapes can also be used.

The anionic particles can have any suitable particle size. Typically, the anionic particles have a particle size range from about 2 microns to about 50 microns. Preferably, the anionic particles have a particle size range from about 5 microns to about 20 microns.

In addition, the anionic particles have a suitable size distribution. Preferably, the anionic particles have a geometric particle size distribution (GSD) of less than about 1.5, and more preferably less than about 1.3. The geometric particle size distribution can be measured using any suitable instrument, such as, for example, a Coulter Counter™, available from Coulter Scientific.

The cationic particles can be formed from emulsion latexes having a basic pH. An exemplary basic emulsion latex that can be used to form the cationic particles comprises a terpolymer of a cationic monomer, butyl acrylate and styrene. The cationic monomer can be, for example, vinylpyridine or a (methyl)acrylate derivative of a quaternary salt, or any other suitable cationic monomers. Suitable cationic monomers that can be used include, for example, 2-vinylpyridine, 3-vinylpyridine, 4-vinylpyridine, acrylamide, methacrylamide, vinylpyrrolidone, vinyl-N-methylpyridinium chloride, 3-methacryloxy-2-hydroxypropyltrimethyl ammonium chloride salt, acryloxy-2-ethyl-tetralkyl ammonium chloride, acryloxy-3-propyltetralkyl ammonium chloride, methacryloxy-2-ethyltetralkyl ammonium chloride, methacryloxy-3-propyltetralkyl ammonium chloride, and mixtures thereof. The alkyl can be methyl, ethyl, propyl, butyl, pentyl, hexyl, or octyl. The cationic monomer is added in an amount of from about 0.5 to about 5 wt % of the resin, and preferably from about 1 to about 3 wt % of the resin.

A water soluble cationic initiator is typically added to the emulsion latex. The cationic initiator can be any suitable cationic initiator. Exemplary suitable water soluble cationic initiators include, for example, VA044, 2,2'-azobis(N,N'-dimethylene isobutyramidine) dihydrochloride, 2,2'-azobis (2-amidinopropane) dihydrochloride, 2,2'-azobis(N,N'-dimethylene isobutyramidine), 2,2'-azobis-2-methyl)-N-[1, 1-bis(hydroxymethyl]propionamide, 2,2'-azobis-2-methyl-N[1,1-bis(hydroxymethyl)ethyl]propionamide, and 2,2'- azobis(isobutyramide)dihydrate. The cationic initiator is added in an amount of from about 0.1 to about 10 wt % of the resin, and preferably from about 1 to about 5 wt % of the resin.

Surfactants can be added in suitable amounts. Exemplary embodiments can include, for example, nonionic surfactants, such as dialkylphenoxypoly (ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. An effective concentration of the nonionic surfactant is typically from about 0.01 to about 10 wt %, and preferably from about 0.1 to about 5 wt % of monomer, or monomers selected to prepare the copolymer resin of the emulsion or latex blend. Other nonionic surfactants that can be used include, for example, polyvinyl alcohol, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, and dialkylphenoxy poly (ethyleneoxy)ethanol, and where the anionic surfactant can be selected, for example, from sodium dodecyl sulfate, sodium dodecylbenzene sulfate and sodium dodecylnaphthalene sulfate.

Examples of ionic surfactants that can be used include, for example, sodium dodecylsulfate (SDS), sodium dodecylbenzene sulfonate, sodium dodecylnaphthalene sulfate, dialkyl benzenealkyl, sulfates and sulfonates, abitic acid (Aldrich), NEOGEN R™, NEOGEN SC™ (Kao), and the like. An effective concentration of the anionic surfactant that can be used is typically from about 0.01 to about 10 wt %, and preferably from about 0.1 to about 5 wt % of monomer, or monomers used to prepare the copolymer resin particles of the emulsion or latex blend. Exemplary anionic surfactants that can be used in various effective amounts, such as from about 1 to about 10 wt %, include sodium dodecylbenzene sulfonate, sodium dodecylnaphthalene sulfate, dialkyl benzenealkyl, sulfates and sulfonates, abitic acid (Aldrich), NEOGEN R™, NEOGEN SC™ (Kao), and the like. The anionic surfactant can also be selected from nonionic surfactants, such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™.

In embodiments, known cationic surfactants can be selected for the emulsion resin blend, such as an alkylbenzalkanium halide, especially the chloride, as described in U.S. Pat. No. 5,370,964, which is incorporated herein by reference in its entirety. An effective amount of cationic surfactant that can be included is typically from about 0.01 to about 10 wt %, and preferably from about 0.1 to about 5 wt % of the components included in the emulsion resin latexExemplary chain transfer agents that can be used in embodiments of the invention include methanethiol, ethanethiol, propanethiol, butanethiol, pentanethiol, hexanethiol, decanethiol, dodecanethiol, carbon tetrabromide, carbon tetrachloride, bromoform, chloroform mixtures thereof and the like. The chain transfer agent can be included in an effective amount, such as, for example, from about 0.01 to about 1 percent, of the emulsion resin.

A suitable pigment is added to the emulsion latex to provide the desired color of the anionic particles. For example, the above-described pigments that are used to form the anionic particles can be used as pigments to form the cationic particles. The aforementioned colorants are utilized in an amount of from about 3 to about 20 wt % of the resin.

As stated, the emulsion latex used to form the cationic particles is basic. The basic emulsion latex can have a pH range of from about 7 to about 12.

The cationic particles can have any suitable particle size. Typically, the cationic particles have a particle size range from about 5 microns to about 40 microns. Preferably, the cationic particles have a particle size range from about 5 microns to about 20 microns.

In addition, the cationic particles have a suitable size distribution. Preferably, the cationic particles have a geometric particle size distribution of less than about 1.5 and, more preferably, less than about 1.3.

Although the above discussion provides examples of specific suitable polymer materials, the invention is in no way limited to those specified materials. Rather, any suitable polymer material may be used, which can include one, two, three or more different monomer species in a wide range of contents. Thus, for example, homopolymers, bi-polymers, terpolymers, and the like can be used in embodiments, as desired. As resin materials, the latex materials of the invention can utilize any of the numerous suitable resins, such as thermoplastic resins, known in the art. Suitable resins that may be utilized in the invention include, but are not limited to, olefin polymers, such as polyethylene, polypropylene and the like; polymers derived from dienes, such as polybutadiene, polyisobutylene, polychloroprene and the like; vinyl and vinylidene polymers such as polystyrene, styrene butyl methacrylate copolymers, styrene butylacrylate copolymers, styrene butadiene copolymers, styreneacrylonitrile copolymers, acrylonitrile-butadiene styrene terpolymers, polymethylmethacrylate, polyacrylate, polyvinyl alcohol, polyvinyl chloride, polyvinyl carbazole, polyvinyl ethers, polyvinyl ketones and the like; fluorocarbon polymers such as polytetrafluoroethylene, polyvinylidene fluoride and the like; heterochain thermoplastics such as polyamides, polyesters, polyurethanes, polypeptides, casein, polyglycols, polysulfides, polycarbonates and the like; and cellulosic copolymers such as regenerated cellulone, cellulose acetate, cellulose nitrate and the like; and mixtures thereof. Of the vinyl polymers, resins containing a relatively high percentage of styrene are preferred, such as homopolymers of styrene or styrene homologs of copolymers of styrene. One preferred resin for use in the latexes of the invention is a copolymer resin of styrene and n-butylmethacrylate. Another preferred resin used in the invention is a styrene butadiene copolymer resin with a styrene content of from about 70 to about 95 wt %, such as PLIOTONE (Goodyear Chemical).

According to the invention, anionic particles and cationic particles that are selected to form bichromal particles preferably have approximately equal particle sizes. The respective particle sizes of the anionic particles and cationic particles preferably differ from each other by less than about 2 microns and, more preferably, by less than about 1 micron.

Having particle sizes that are approximately equal to each other enhances the production yield of bichromal particles having a one-to-one ratio of anionic particles and cationic particles, i.e., bichromal particles comprising only one anionic particle and only one cationic particle.

The terpolymer of the emulsion latex used to form the anionic particles typically has a glass transition temperature of from about 50° C. to about 65° C. The terpolymer of the emulsion latex used to form the cationic particles typically has a glass transition temperature of from about 50° C. to about 65° C. According to the invention, the terpolymer of the emulsion latex used to form the anionic particles and the terpolymer of the emulsion latex used to form the cationic particles preferably have respective glass transition temperatures that differ from each other by less than about 5° C.

The emulsion latex used to form the anionic particles typically can have a molecular weight of from about 20,000 to about 50,000. The emulsion latex used to form the cationic particles typically can have a molecular weight of from about 20,000 to about 50,000. According to the invention, the respective emulsion latexes used to form the anionic particles and the cationic particles preferably have respective molecular weights that differ from each other by less than about 5,000.

The mixed anionic and cationic particles are aggregated by an aggregating process under controlled conditions, to control the aggregate size to as close to a one-to-one ratio of anionic particles to cationic particles per bichromal particle as can be achieved, i.e, to reduce the percentage of bichromal particles formed that include more than one anionic particle and/or one cationic particle. As stated above, the anionic particles and cationic particles that are mixed together to form aggregates preferably are selected in terms of their relative sizes, and the relative glass transition temperatures and molecular weights of the terpolymers of the emulsions latexes used to form the anionic particles and cationic particles. These factors are preferably closely matched to achieve a maximum high yield of bichromal particles having an aggregate size that is close to a one-to-one ratio of anionic particles to cationic particles per bichromal particle.

The aggregated anionic and cationic particles are coalesced to form bichromal particles that preferably comprise one anionic particle and one cationic particle. The mixture of anionic particles and cationic particles can be heated to enhance coalescence. Typically, the mixture can be heated to a temperature of from about 70° C. to about 95° C.

In addition, the pH of the mixture to cause aggregation of anionic and cationic particles can be adjusted to about 3, followed by addition of suitable ionic surfactant, such as dodecylbenzenesulfonate, and pH adjustment to about 7, using sodium hydroxide, followed by heating to enhance coalescence of the aggregates.

The bichromal particles can be used in various gyricon sheets and gyricon displays. An exemplary embodiment of a gyricon display 10 according to this invention is shown in FIG. 1. Bichromal particles 12 are disposed in an elastomer binder of the sheet 14 that is swelled by a dielectric fluid creating cavities 16 in which the bichromal particles 12 are free to rotate. The bichromal particles 12 are electrically dipolar in contact with the fluid and are subject to rotation upon application of an electric field, as produced by matrix-addressable electrodes 1 a, 18b. The electrode 18a closest to viewing surface 20 is preferably transparent. An observer at I sees an image formed by the black and white pattern of the bichromal particles 12 as rotated to expose their different colored faces (hemispheres) to the viewing surface 20 of sheet 14.

In making gyricon sheets of gyricon displays, the binder, typically an elastomer, of the sheet 14 is soaked in the dielectric fluid after it is cured. This soaking swells the binder to create the cavities 16 slightly larger than, and surrounding, the bichromal particles 12. The cavities are filled with the dielectric fluid.

EXAMPLES

Example 1

Preparation of Cationic LatexA latex is prepared comprising 30 percent resin particles in water containing 1.7 percent nonionic surfactant (ANTAROX™) and 1.8 percent of cationic surfactant (SANIZOL B™), dodecanethiol, carbon tetrabromide and a cationic initiator (2,2'-azobis(N,N'-dimethyiene isobutyramidine) dihydrochloride). The resin is derived from styrene and butyl acrylate, and 3-methacryloxy-2-hydroxypropyltrimethyl ammonium chloride.

A 1 liter Buchi reactor equipped with a mechanical stirrer is charged with styrene (328 grams), butyl acrylate (72 grams), dodecanethiol (12 grams), carbon tetrabromide (4 grams), 3-methacryloxy-2-hydroxypropyltrimethyl ammonium chloride (16 grams), water (500 grams), ANTAROX™ (8.6 grams), SANIZOL B™ (9 grams) and 2,2'-azobis(N, N'-dimethylene isobutyramidine) dihydrochloride (13.5 grams). The resulting mixture is heated to a temperature of 70° C. under a nitrogen atmosphere for 6 hours. A 10 gram sample is then freeze dried and evaluated as having a number average molecular weight ($M_n$) of 9,390, and a weight average molecular weight ($M_w$) of 70,291 for the resin, as measured by gel permeation chromatography using polystyrene as standard. The glass transition temperature of the is 60° C. as measured using a DuPont differential scanning calorimeter (DSC).

Example 2

Preparation of Black Cationic Spheres 10 micron black cationic spherical particles comprised of 5 wt % of Reagal 330 black pigment, and 95 wt % of terpoly(styrene-butylacrylate-3-methacryloxy-2-hydroxypropyltri methyl ammonium chloride) of Example 1 is prepared as follows: In a one liter flask equipped with a mechanical stirrer, 300 grams of the latex of Example 1 is added. To this stirred mixture is then added dropwise a 1 percent aqueous solution of potassium hydroxide until the pH is about 10, as measured using Litmus pH paper. The mixture is continually stirred at 25° C. for a duration of three hours. In a separate 300 ml metal beaker, a pigment dispersion is prepared by adding 15 grams of Regal 330 carbon Black, 1.2 grams of NEOGEN R™ (anionic surfactant) and 100 grams of water. The pigment is dispersed using a polytron at 8,000 rpm for 5 minutes. The pigment dispersion is then added to the 1 liter flask containing the latex followed by the addition of 100 grams of water. Particle aggregation occurs and the flask mixture is homogenized at 2,000 rpm for 2 minutes at 25° C. The mixture is then heated to about 60° C. for 1 hour, followed by the addition of 0.5 gram of SANIZOL B™ in 25 grams of water. The mixture is then heated to 96° C. for 2 hours, followed by heating for an additional 3 hours. The mixture is then cooled to room temperature (about 25° C.), filtered off, washed excessively with water (about 16 liters), and dried by freeze drying. The particle size is then measured to be 10.2 microns with a geometric distribution of 1.32, using a Coulter Counter. In embodiments of the invention, the latex particle resin is derived with a cationic initiator and other components to enable effective aggregation, coalescence, and preparation of bichromal spheres.

Example 3

Preparation of Anionic Latexln a 1 liter flask equipped with a mechanical stirrer is added 176 grams of styrene, 24 grams of butyl acrylate, 4 grams of acrylic acid, and 6 grams of dodecane thiol, are mixed with 300 ml of deionized water in which 4.5 grams of sodium dodecyl benzene sulfonate anionic surfactant (NEOGEN R™—60% active component), 4.3 grams of polyoxyethylene nonyl phenyl ether nonionic surfactant (ANTAROX 897™—70% active ingredient), and 2 grams of potassium persulfate initiator, are dissolved. The emulsion is then polymerized at 70° C. for 8 hours. A latex containing 40 percent solids with a particle size of 106 nm, as measured using a Brookhaven nanosizer, is obtained. The latex has the following properties: Tg=74° C., as measured using a DuPont DSC; $M_w$=46,000; and $M_n$=7,700.

Example 4

Preparation of White Anionic SpheresTitanium oxide (3.4 grams), at a 10 wt % loading, is dispersed in 120 ml of deionized water containing 0.5 gram of alkylbenzyldimethyl ammonium chloride cationic surfactant using an ultrasonic probe for 2 minutes. This dispersion of the pigment is then homogenized with a Brinkman probe for 2 minutes at 10,000 rpm, while 60 milliliters of latex from Example 3 above, (40 percent solids, 2 percent acrylic acid) is slowly added. This mixture is diluted with 120 ml of water and then transferred into a kettle. After 24 hours of stirring (250 rpm) at room temperature (about 25° C.), microscopic observation evidenced pigmented particle clusters of uniform size indicating aggregation of pigment particles with latex particles and that their growth is achieved. A small sample of 10 grams of particles in water comprised 90 percent resin styrene, butyl acrylate, acrylic acid, (ST/BA/AA) and 10 percent pigment, and is taken and heated to a temperature of 80° C. for two hours to coalesce the particles. The particle size is then measured using a Coulter Counter. Particles having a 9.9 micron average volume diameter are obtained with a GSD=1.16. A Coulter Counter trace revealed no particles below 4 microns.

The kettle contents are stirred for an additional 24 hours (48 hours total), and heated to 80° C. for two hours to coalesce the particles. The particle size is measured again using a Coulter Counter. Particles (comprised of 90 percent of resin (ST/BA/AA) and 10 percent of pigment) having a size of 10.0 microns are obtained with a GSD=1.16, indicating no further growth in the particle size after all the fines are consumed. The particles are then washed with water and dried. The above-described white anionic spheres obtained with 10 percent of the above white pigment have the following properties: Tg=72° C.; $M_w$=43,000; and $M_n$=12,500. The yield of the toner particles is 98 percent.

Example 5

Preparation of Bichromal White and Black SpheresAnionic white spheres (50 grams) of Example 4, and cationic black spheres (50 grams) of Example 2, are added together with 600 grams of water and 1 gram of nonioinic surfactant (Igepal 990) to a 1 liter kettle. The mixture is stirred and the pH of the mixture is adjusted to about 3 with dilute 1 N nitric acid, and the mixture is allowed during agitation to form particle aggregations. The majority (about 85%) of the aggregation is an aggregate of 2 to 4 particles of different colors, with some free non-aggregated spheres (about 15%). The mixture is then adjusted to a pH of 7 with sodium hydroxide (1N), and a 1 percent solution of sodium dodecyl benzene sulfonate is added slowly followed by heating to about 80° C., for a duration of about 8 hours to achieve coalescence and formation of coalesced spheres. Larger coalesced spheres are then separated from non-aggregated spheres by sieving the smaller spheres through a 15 micron sieve. The coalesced sphere particles, retained from the 15 micron sieve, and which comprise 2-4 aggregated particles, are separated utilizing a 25 micron screen. The two-particle coalesced spheres that are filtered through the 25 micron sieve are then collected by filtration and dried. Although some two-particle monochromal spheres are also formed by two-particle aggregation of similar colors, these spheres are removed by placing the classified mixture of two-particle coalesced spheres in a cell comprised of a dielectric fluid, such as Isopar L, and applying an electrostatic field such that the particles migrate to opposite electrodes, and are mostly comprised of monochromal black spheres and bichromal black and white hemispheres, with some monochromal white spheres migrating towards the opposite electrode or suspended in solution. The particles from both electrodes are separated. The separated fraction from one electrode, including a mixture of monochromal black spheres and bichromal black and white spheres, is then placed in the cell again, and an electrostatic field of opposite polarity is applied, causing the bichromal spheres to migrate to one electrode, and remaining monochromal spheres to migrate to the opposite electrode or remain in solution. The bichromal spheres are then removed from the electrode, producing essentially bichromal spheres. The overall yield after electrolytic separation is about 15 percent by weight.

The bichromal spheres obtained from this example can be utilized in a gyricon display according to the process disclosed in U.S. Pat. No. 4,261,653.

While the invention has been described in conjunction with the specific embodiments described above, it is evident that many alternatives, modifications and variations are apparent to those skilled in the art. Accordingly, embodiments of the invention as set forth above are intended to be illustrative and not limiting. Various changes can be made without departing from the spirit and scope of the invention.

What is claimed is:

1. An in-situ process for making bichromal particles, comprising:

forming first particles having a first color and an anionic surface charge;

separately forming second particles having a second color and a cationic surface charge;

mixing the first particles and second particles;

aggregating the first particles and second particles in a one-to-one ratio with respect to each other; and coalescing the aggregated first particles and second particles to form bichromal particles that comprise one first particle and one second particle.

2. The process of claim 1, wherein the first particles are black and the second particles are white.

3. The process of claim 1, wherein the first particles are white and the second particles are black.

4. The process of claim 1, wherein the first particles are formed from a first emulsion latex.

5. The process of claim 4, wherein the first emulsion latex is acidic and comprises a first terpolymer of an anionic monomer, butyl acrylate and styrene, an anionic initiator, and a first pigment.

6. The process of claim 5, wherein the anionic monomer is acrylic acid.

7. The process of claim 1, wherein the second particles are formed from a second emulsion latex.

8. The process of claim 7, wherein the second emulsion latex is basic and comprises a second terpolymer of a cationic monomer, butyl acrylate and styrene, a cationic initiator, and a second pigment.

9. The process of claim 8, wherein the cationic monomer is vinyl pyridine.

10. The process of claim 1, wherein the first particles and second particles have approximately equal particle sizes.

11. The process of claim 1, wherein the first particles are formed from an acidic first emulsion latex comprising a first terpolymer, the second particles are formed from a basic second emulsion latex comprising a second terpolymer, and the first terpolymer and the second terpolymer have respective glass transition temperatures that differ by less than about 5° C.

12. The process of claim 1, wherein the first particles are formed from an acidic first emulsion latex comprising a first terpolymer, the second particles are formed from a basic second emulsion latex comprising a second terpolymer, and the first terpolymer and the second terpolymer have respective molecular weights that differ by less than about 5,000.

13. An in-situ process for making bichromal particles, comprising:
   forming first particles having a first color and an anionic surface charge from a first emulsion latex;
   separately forming second particles having a second color and a cationic surface charge from a second emulsion latex;
   mixing the first particles and second particles;
   aggregating the first particles and second particles in a one-to-one ratio with respect to each other; and
   coalescing the aggregated first particles and second particles to form bichromal particles that comprise one first particle and one second particle;
   wherein the first particles and second particles have approximately equal particle sizes;
   wherein the first emulsion latex comprises a first terpolymer, the second emulsion latex comprises a second terpolymer, and the first terpolymer and the second terpolymer have respective glass transition temperatures that differ by less than about 5° C.; and
   wherein the first terpolymer and the second terpolymer have respective molecular weights that differ by less than about 5,000.

14. A process for making a gyricon sheet, comprising:
   forming first particles having a first color and an anionic surface charge;
   separately forming second particles having a second color and a cationic surface charge;
   mixing the first particles and second particles;
   aggregating the first particles and second particles in a one-to-one ratio with respect to each other;
   coalescing the aggregated first particles and second particles to form bichromal particles that comprise one first particle and one second particle;
   providing a transparent optical medium comprising a plurality of cavities, the cavities containing a transparent dielectric fluid; and
   placing a single one of the bichromal particles in each of the cavities.

15. The process of claim 13, wherein the gyricon sheet is sandwiched between two transparent substrates.

16. The process of claim 13, wherein the first particles are black, and the second particles are white.

17. The process of claim 13, wherein the first particles are white, and the second particles are black.

18. The process of claim 13, wherein the first particles are formed from a first emulsion latex, and the second particles are formed from a second emulsion latex.

19. The process of claim 13, wherein the first particles and the second particles have approximately equal particle sizes.

20. The process of claim 13, wherein the first particles are formed from an acidic first emulsion latex comprising a first terpolymer, the second particles are formed from a basic second emulsion latex comprising a second terpolymer, and the first terpolymer and the second terpolymer have respective glass transition temperatures that differ by less than about 5° C.

21. The process of claim 13, wherein the first particles are formed from an acidic first emulsion latex comprising a first terpolymer, the second particles are formed from a basic second emulsion latex comprising a second terpolymer, and the first terpolymer and the second terpolymer have respective molecular weights that differ by less than about 5,000.

* * * * *